United States Patent
Peng

(10) Patent No.: US 9,401,837 B2
(45) Date of Patent: Jul. 26, 2016

(54) NETWORK MANAGEMENT METHOD AND NETWORK MANAGEMENT SYSTEM

(75) Inventor: Yonglin Peng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 836 days.

(21) Appl. No.: 13/636,977

(22) PCT Filed: Mar. 7, 2011

(86) PCT No.: PCT/CN2011/071578
§ 371 (c)(1),
(2), (4) Date: Sep. 24, 2012

(87) PCT Pub. No.: WO2011/116652
PCT Pub. Date: Sep. 29, 2011

(65) Prior Publication Data
US 2013/0024558 A1   Jan. 24, 2013

(30) Foreign Application Priority Data
Mar. 23, 2010  (CN) .......................... 2010 1 0140214

(51) Int. Cl.
G06F 15/173 (2006.01)
H04L 12/24 (2006.01)
H04L 29/08 (2006.01)

(52) U.S. Cl.
CPC .......... *H04L 41/042* (2013.01); *H04L 41/0668* (2013.01); *H04L 41/0893* (2013.01); *H04L 67/104* (2013.01)

(58) Field of Classification Search
USPC ................................................ 709/223, 204
See application file for complete search history.

(56) References Cited

U.S. PATENT DOCUMENTS

2002/0184070 A1* 12/2002 Chen et al. .................... 705/9
2010/0142409 A1*  6/2010 Fallon et al. ................ 370/255

FOREIGN PATENT DOCUMENTS

| CN | 101072133 A | 11/2007 |
| CN | 101170578 A | 4/2008 |
| CN | 101340331 A | 1/2009 |
| WO | 2008/110460 A2 | 9/2008 |

OTHER PUBLICATIONS

P2P-Based Layered and Distributed Self-organized Network Management Method, Telecommunications Information, Weiding Ma et al, Issue No. 9, Year 2008 [English Translation Version, pp. 1-26].*

(Continued)

*Primary Examiner* — Philip B Tran
(74) *Attorney, Agent, or Firm* — Bright IP Law Offices

(57) ABSTRACT

The present invention provides a network management method and a network management system (30). The network management system comprising: a manipulating organ and a peer-to-peer network, with the peer-to-peer network consisting of a plurality of function units, wherein, the manipulating organ is configured to generate a management task according to an operation of a management role and to send the management task to the peer-to-peer network; and the function units in the peer-to-peer network are configured to perform the management task for a managed network or store relevant data. With the present invention, equipment cost can be reduced and normal running of the network management is guaranteed.

20 Claims, 9 Drawing Sheets

(56) References Cited

OTHER PUBLICATIONS

P.R. China, State Intellectual Property Office, International Search Report for International Application No. PCT/CN2011/071578, mailed Apr. 28, 2011.

Weiding Ma and Jun Li, Method for Managing Hierarchical Distributed Self-organizing Network based on P2P, Telecommunications Information, Sep. 10, 2008, No. 9 of 2008, pp. 23-27, ISSN 1006-1339.

P.R. China, State Intellectual Property Office, First Office Action for CN App. No. 201010140214.0, mailed Jun. 13, 2014.

3rd Generation Partnership Project; Technical Report Group Services and System Aspects; Telecommunication management; Application guide for use of Integration Reference Points (IRPs) on peer-to-peer (p2p) Interface (Release 7) 3GPP TR 32.806 v1.1.0 (Feb. 2006).

Active Worm Propagation in Hierarchical Peer-to-Peer Network Management Systems, Saadat Z. Z., et al., 2009 Second International Conference on Communication Theory, Reliability, and Quality of Service, IEEE, 2009.

Availability measurement in Peer to Peer Network Management Systems, Karimi O. B., et al., IEEE, 2008.

EPO, Extended European Search Report for EP App. No. 11758762.6, mailed Nov. 18, 2013.

\* cited by examiner

NETWORK MANAGEMENT METHOD AND NETWORK MANAGEMENT SYSTEM

CROSS REFERENCE TO RELATED APPLICATIONS

This application is the U.S. National Stage of International Patent Application No. PCT/CN2011/071578 filed on Mar. 7, 2011, which claims priority to Chinese Patent Application No. 201010140214.0 filed on Mar. 23, 2010. Both the PCT Application and Chinese Application are hereby incorporated by reference in their entirety.

FIELD OF THE INVENTION

The present invention relates to computer network and communication field, and in particular to a network management method and a network management system.

BACKGROUND OF THE INVENTION

At present, network management mainly employs a hierarchical management mode. FIG. 1 is an architecture schematic diagram of a network management system in the related art. As shown in FIG. 1, each of the Element Management Systems (EMS) manages Net Elements (NE) in the subnetworks, and the Network Management System (NMS) manages NEs in the whole network via EMSs. The unitizational relationship and permission among EMSs have relatively high independence, and each NE can be managed by only one EMS. As shown in FIG. 1, EMS1 to EMS4 independently undertake management of NEs governed by them.

Although the network management system is not the core of business, it also has requirements on high performance and high stability. When the managed network is huge and there are many managed NEs, if the above hierarchical network management mode is employed, the system needs to be established by high-performance hardware equipment. Furthermore, as each EMS is independent, each EMS needs at least an expensive equipment with high performance in the network management architecture shown in FIG. 1. So, the cost of network management with the network architecture shown in FIG. 1 is relatively high.

In addition, as the unitizational relationship and permission among EMSs have relatively high independence and each NE can be managed by only one EMS, when one of the EMSs breaks down, other EMSs are unable to take over the operation of the EMS automatically, as a result, tasks charged by the EMS cannot be executed normally (for example, relevant management data cannot be collected). In order to avoid this problem, it is necessary to equipment a spare EMS for each EMS, the cost of network management system is further increased. Furthermore, as spare EMSs are idle for the most of time, the utilization of equipment is also lowered.

SUMMARY OF THE INVENTION

The present invention provides a NMS and a network management method, to at least solve one of the above problems.

According to one aspect of the present invention, a NMS is provided, comprising: a manipulating organ and a peer-to-peer network, with the peer-to-peer network consisting of a plurality of function units, wherein, the manipulating organ is configured to generate a management task according to an operation of a management role and to send the management task to the peer-to-peer network; and the function units in the peer-to-peer network are configured to perform the management task for a managed network or store relevant data.

Preferably, a first function unit in the peer-to-peer network is configured to receive the management task sent by the manipulating organ and forward the management task to a second function unit in the peer-to-peer network, wherein an ID of the second function unit and an ID of a target net element in the managed network managed by the management task meet a preset matching relationship; the second function unit is configured to store the management task and forward the management task to a third function unit in the peer-to-peer network, wherein the third function unit is a function unit connected with the target net element; and the third function unit is configured to forward the management task to the target net element.

Preferably, the third function unit is further configured to receive management data returned by the target net element in response to the management task, and to send the management data to the second function unit; and the second function unit is further configured to receive and to save the management data.

Preferably, the second function unit is further configured to forward the management data to the first function unit; and the first function unit is further configured to forward the management data to the manipulating organ.

Preferably, the manipulating organ is further configured to send a query request to the first function unit, to request a query of management data reported by the target net element; the first function unit is further configured to forward the query request to the second function unit; and the second function unit is further configured to query the saved management data according to the query request, and to return query results to the manipulating organ via the second function unit and the first function unit.

Preferably, the manipulating organ is further configured to receive permission information set for a management role, and to send the permission information to the peer-to-peer network; and the function units in the peer-to-peer network are further configured to store permission information of the management role.

Preferably, the manipulating organ is further configured to query permission information of the management role from the peer-to-peer network; and the peer-to-peer network is further configured to query the stored permission information, and to return the obtained permission information of the management role to the manipulating organ.

Preferably, the permission information of the management role is stored in one function unit in the peer-to-peer network, wherein the ID of this function unit and the ID of the management role meet a predetermined matching relationship, or, the ID of this function unit and the ID of the manipulating organ meet a predetermined matching relationship.

Preferably, the function units in the peer-to-peer network are further configured to store corresponding relationships between the ID of a function unit to which each net element of the managed network is connected and the ID of this net element.

Preferably, the function units in the peer-to-peer network are further configured to store corresponding relationships between the ID of a function unit to which the manipulating organ is connected and the ID of the manipulating organ.

According to another aspect of the present invention, a network management method is provided and used in a network management system comprising a manipulating organ and a peer-to-peer network, wherein the peer-to-peer network consists of function units, the method comprises: the manipulating organ generating or setting a management task according to an operation of a management role and sending the management task to the peer-to-peer network; and the function units in the peer-to-peer network receiving the management task, and sending the management task to a target net element in a managed network corresponding to the management task.

Preferably, the function units in the peer-to-peer network receiving the management task and sending the management task to the target net element comprises: a first function unit in the peer-to-peer network receiving the management task, and obtaining a second function unit in the peer-to-peer network, wherein an ID of the second function and the ID information meet a preset matching relationship; the first function unit forwarding the management task to the second function unit; the second function unit receiving the management task and obtaining an ID of a third function unit in the peer-to-peer network, wherein the third function unit is a function unit connected with the target net element; the second function unit forwarding the management task to the third function unit; and the third function unit receiving the management task and sending the management task to the target net element.

Preferably, after the second function unit receiving the management task, the method further comprises: the second function unit storing the management task.

Preferably, after sending the management task to the target net element, the method further comprises: the target net element reporting management data corresponding to the management task to the third function unit; the third function unit forwarding the management data to the second function unit; and the second function unit receiving and storing the management data.

Preferably, after the second function unit receiving the management data, the method further comprises: the second function unit sending the management data to the first function unit; and the first function unit forwarding the management data to the manipulating organ.

Preferably, after the plurality of function units store the management data, the method further comprises: the manipulating organ sending a query request to the first function unit, to query the management data reported by the target net element; the first function unit forwarding the query request to the second function unit; and the second function unit querying the saved management data according to the query request, and forwarding the obtained management data to the manipulating organ via the first function unit.

Preferably, before the manipulating organ sends a management task to the peer-to-peer network, the method further comprises: the manipulating organ sending a query message to the peer-to-peer network, to query permission information of the management role; and the manipulating organ receiving the permission information returned by the peer-to-peer network, and according to the permission information, determining that the management role has a permission for setting the management task.

With the present invention, function units forming a peer-to-peer network perform management for the managed network and function units contact with each other by means of peer-to-peer network, therefore requirements on equipment are not high and no high-performance server is needed. The problem of relatively high cost due to independence of EMSs in the related art is solved, and the equipment cost is reduced. Furthermore, as function units contact with each other, when a function unit to which a managed NE accesses breaks down, the managed NE can select another function unit to access, so that the normal operation of network management is guaranteed.

BRIEF DESCRIPTION OF THE DRAWINGS

Drawings described herein are provided for further understanding of the disclosure and form a part of the application. Exemplary embodiments of the disclosure and descriptions thereof are used for explaining the disclosure and form no improper limit of the disclosure. In the drawings.

DETAILED DESCRIPTION OF THE EMBODIMENTS

The present invention will be explained in detail hereinafter in conjunction with the drawings and the embodiments. What needs to be explained is, if there is no conflict, the embodiments of the present invention and the characters in it can be combined with each other.

Figure 1:
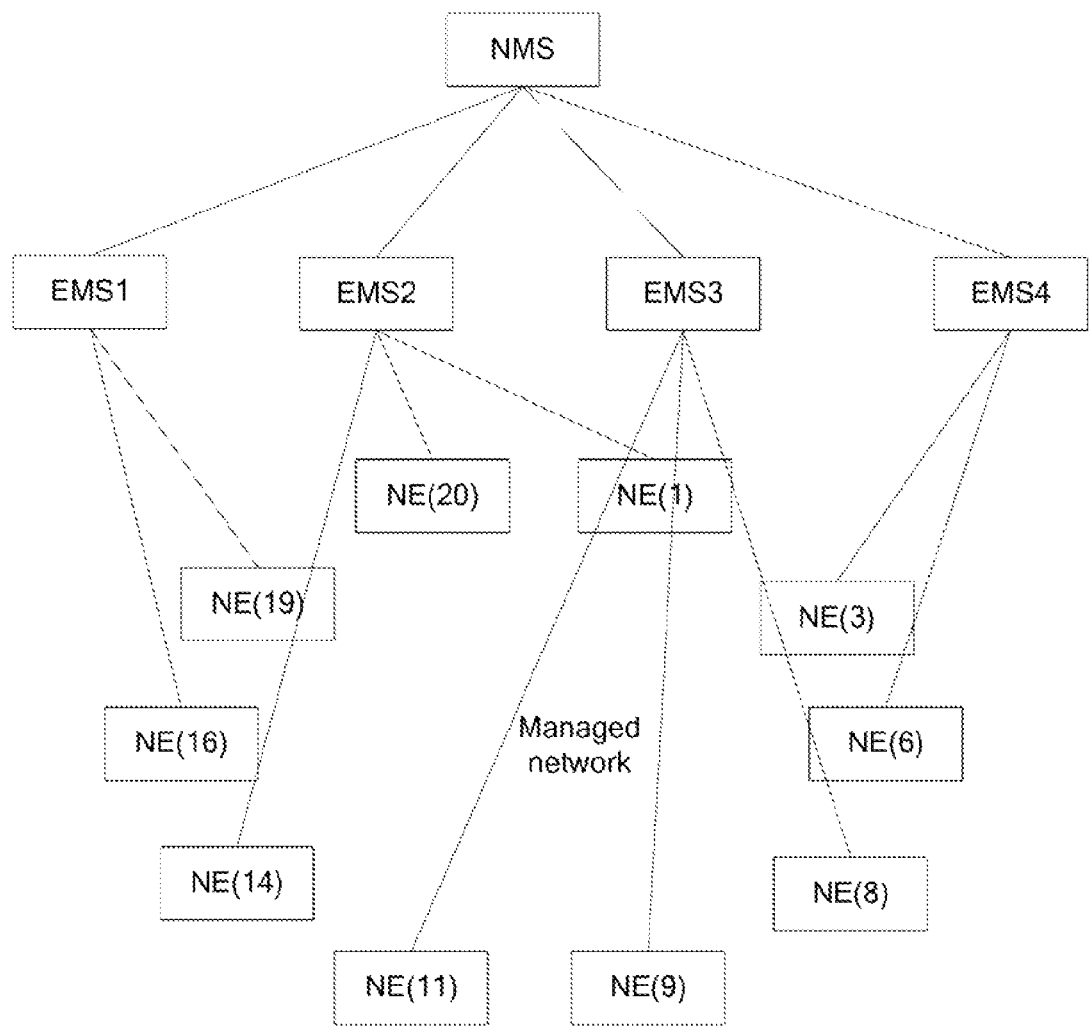
FIG. 1 is an architecture schematic diagram of a NMS according to the related art.
Figure 2:
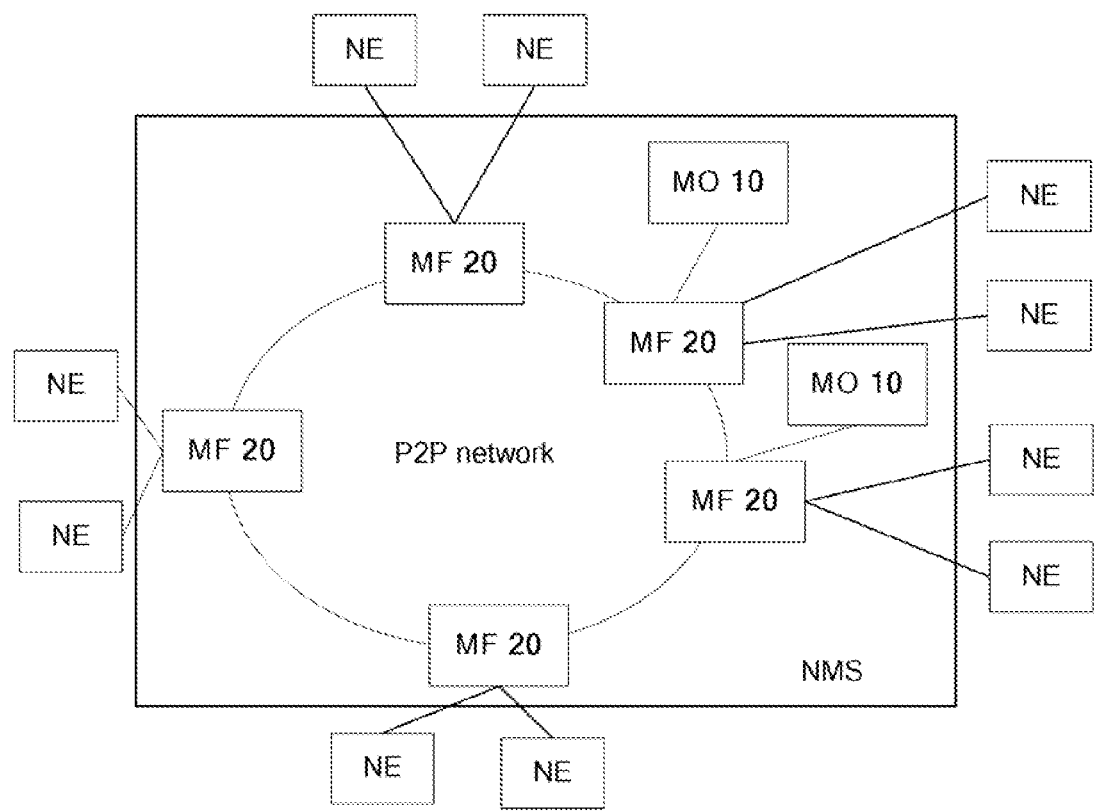
FIG. 2 is a schematic diagram of a NMS according to an embodiment of the present invention.

FIG. 2 is a structure schematic diagram of a NMS according to an embodiment of the present invention, and as shown in FIG. 2, in the embodiment of the present invention, the NMS at least includes manipulating organ (MO) 10 and a peer-to-peer network consisting of a plurality of function units 20, wherein the plurality of function units 20 form a Peer-to-Peer (P2P) network by means of P2P protocol, the plurality of function units 20 interact messages by means of P2P protocol, and NEs of a managed network access the P2P network via one or more function units 20. Serving as an operating end and accessing the P2P network via one or more function units 20, the MO 10 is configured to generate or set a management task according to operation of a management role and to send the management task to the P2P network. The function units 20 in the P2P network are configured to perform the management task for the network or store relevant data.

In embodiments of the present invention, each one of the function units 20 and the MO 10 can be implemented by a common computer. Furthermore, the MO 10 and the function units 20 can be deployed separately, the MO 10 and the function units 20 also can be deployed together, that is, two function modules are set in a same computer, one function module is configured to implement functions of the MO 10, and the other function module is configured to implement functions of the function units 20.

With the NMS according to embodiments of the present invention, a plurality of function units forming the P2P network manages the managed network, so that, requirements on equipment are decreased, and the cost of equipment can be reduced.

In embodiments of the present invention, the MO 10 is further configured to receive permission information set for each management role and to send the permission information to the P2P network. The function units 20 in the P2P network are further configured to store the permission information. In practical application, management roles may include super management role and general management role. A super management role can manage the whole managed network and can authorize general management role. The permission information set by the MO 10 may include: nodes in the managed network allowed to be managed by a management role and the permission of management function that can be executed by the management role. For a general management role, network management can be performed only within its permission. By setting the permission information, the security of network management can be guaranteed.

During the practical implementation, when the permission information of a management role is stored in the P2P network, the permission information can be stored in an in-charge function unit in the P2P network corresponding to the management role. In this way, management roles can be managed uniformly by the in-charge function unit, when the management role sets a management task via other MOs 10, the permission information of the management role can be obtained via the P2P network, so that the authentication of the management role is implemented.

It should be noted that, in embodiments of the present invention, management role, MO and in-charge function unit of NEs of the managed network is such a function unit in the NMS: the resource ID of the function unit and the ID information of the management role, MO and NEs of the managed network meet a predetermined matching relationship, that is, the ID information of a management role, MO and NE of the managed network is used as a variable, calculation is performed with a predetermined algorithm (for example, HASH algorithm, MD5 algorithm or the like), the result of calculation is the resource ID of the function unit.

Therefore, in embodiments of the present invention, while setting a management task in response to a management role, the MO 10 is further configured to send a query message to query permission information of the management role to the P2P network. The function units 20 in the P2P network are further configured to return obtained permission information of the management role to the MO 10. In practical application, when querying the permission of the management role which logs in currently, the MO 10 first sends a query request to an access function unit of the MO 10 (i.e., function unit coupled to the MO 10 in the P2P network). The access function unit generates a resource ID according to the ID of the management role to be queried and then forwards the query request to an in-charge function unit (this function unit is an in-charge function unit of the management role in the P2P network) corresponding to the resource ID. The in-charge function unit queries saved permission information according to the query request and then returns the permission information to the MO 10 via the access function unit of the MO 10. According to the returned permission information, the MO 10 judges whether the management role is permitted to set the management task, and sends a management message carrying the management task to the P2P network in a case that the management role is permitted to set the management task, so that the security of the managed network can be guaranteed.

It should be noted that, although the MO 10 accesses the P2P network via only one function unit 20 in FIG. 2, but it is not limited hereto. In practical application, the MO 10 also can access the P2P network via a plurality of function units (20) (in embodiments of the present invention, these function units are called access function units of the MO 10). Furthermore, the corresponding relationship between the MO 10 and the access function units thereof can be stored in the P2P network (i.e., the plurality of function units 20 in the NMS) In this way, when sending a message to the MO 10, the P2P network can obtain access function units of the MO 10 according to the corresponding relationship, and then send the message to the MO 10 via the access function units thereof.

Preferably, the corresponding relationship between the MO 10 and the access function units thereof can be stored in the in-charge function unit of the management role that logs on the MO 10 currently, and also can be stored in the in-charge function unit of the MO 10, to implement uniform management of relevant information.

In addition, although each managed NE accesses the P2P network via only one function unit 20 in FIG. 2, but it is not limited thereto. In practical application, each managed NE also can access the P2P network via a plurality of function units 28 (in embodiments of the present invention, these function units are called access function units of the managed NE). Furthermore, in embodiments of the present invention, the corresponding relationship between a managed NE and an access function units thereof can be stored in the P2P network. In this way, when sending a message to a managed NE, the P2P network can obtain access function units of the managed NE according to the corresponding relationship, and then send the message to the managed NE via the access function units thereof.

Preferably, the corresponding relationship between a managed NE and an access function units thereof can be stored in an in-charge function unit of the managed NE in the P2P network, to implement uniform management of the managed NE.

In the NMS, performing a management task for the managed network means: sending a management task to a target NE corresponding to the management task, and receiving management data reported by the target NE in response to the management task. Therefore, in embodiments of the present invention, a first function unit (i.e., access function unit of the MO 10) in the P2P network is configured to receive a management task sent by the MO 10 and to forward the management task to a second function unit in the P2P network, wherein the ID of the second function unit and the ID of a target NE in the managed network managed by the management task meet a preset matching relationship, that is, the second function unit is the in-charge function unit of the target NE. The second function unit is configured to store the management task and to forward the management task to a third function unit in the P2P network, wherein the third function unit is a function unit connected with the target NE, that is, the third function unit is the access function unit of the target NE. The third function unit is configured to forward the management task to the target NE. Therefore, the management task is sent to the target NE in the managed network.

After receiving the management task sent by the third function unit, the target NE executes the management task and reports corresponding management data according to the management task. Specifically, the third function unit is further configured to receive management data returned by the target NE in response to the management task, and to send the management data to the second function unit. The second function unit is further configured to receive and save the management data. Therefore, the report of management data is implemented.

Further, the second function unit is further configured to forward the management data to the first function unit and the first function unit is further configured to forward the management data to the MO 10. Therefore, the MO 10 can obtain the management data reported by the target NE.

In practical application, when sending a management task to the managed NE (i.e., target NE), the MO 10 first sends the management task to the access function unit (i.e., the first function unit) of the MO 10. The access function unit generates a resource ID according to the ID of the target NE and then forwards the management task to an in-charge function unit (i.e., the in-charge function unit of the target NE, also the second function unit) corresponding to the resource ID. The in-charge function unit stores the management task, obtains the access function unit (i.e., the third function unit) of the target NE, and then forwards the management task to the access function unit. The access function unit forwards the management task to the target NE. When reporting the management data, the managed NE first sends the management data to the access function unit of the NE. The access function unit generates a resource ID according to the ID information of the NE and forwards the management data to an in-charge function unit (i.e., the in-charge function unit of the managed NE) corresponding to the resource ID. The in-charge function unit stores the reported management data and sends the management data to the access function unit of the MO 10. The access function unit sends the management data to the MO 10.

As the in-charge function unit of the target NE stores the management data reported by the target NE, in embodiments of the present invention, the MO 10 is further configured to send a query request to the P2P network to query the management data reported by the target NE; the function units 20 in the P2P network are further configured to query the saved management data according to conditions in the query request and return corresponding query results to the MO 10, in practical application, when querying the management data, the MO 10 first sends a query request to an access function unit thereof, and the access function unit generates a resource ID according to the ID of the target NE to be queried and then forwards the query request to a function unit (i.e., in-charge function unit of the target NE) corresponding to the resource ID. The in-charge function unit queries the stored management data according to conditions in the query request and then returns the management data meeting the conditions to the MO 10 via the access function unit of the MO 10.

Through embodiments of the present invention, a NMS with high stability, high expansibility and flexible management permission setup can be established and operated with relatively low costs via inexpensive equipment such as a common PC, and various networks can be managed effectively. Furthermore, as function units of the NMS have no strict division in terms of geographic or administrative region or role, the managed NEs can select access function units freely and the in-charge function units also can be adjusted automatically according to P2P algorithm. Therefore, when parts of function units break down or operate unstably, the managed NEs can access the P2P network and perform relevant processing via other available function NEs, so that the normal running of network management is guaranteed.

Figure 3:
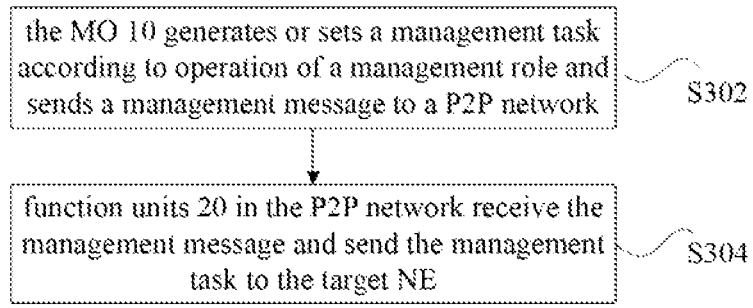
FIG. 3 is a flow chart of a network management method according to an embodiment of the present invention.

FIG. 3 is a flow chart of a network management method according to an embodiment of the present invention, the method can be used in the NMS shown in FIG. 2, and the method mainly includes the following steps (Step 302 to Step 304).

Step 302, the MO 10 generates or sets a management task according to operation of a management role and sends a management message to a P2P network, wherein the management message carries the management task and ID of a target NE corresponding to the management task in the managed network.

Step 304, function units 20 in the P2P network receive the management message and send the management task to the target NE.

Through the network management method provided in the embodiment of the present invention, the MO 10 sends a management message to the P2P network consisting of a plurality of function units 20, and the function units 20 in the P2P network send the management task to the target NE, so that requirements on equipment can be decreased, and the cost of equipment can be reduced.

During the specific implementation, the plurality of function units 20 can send the management task to the target NE through the following steps.

Step 1, an access function unit of the MO 10 receives the management message, generates a corresponding resource ID according to the ID information of the target NE with a preset algorithm (for example, HASH algorithm), and obtains a function unit corresponding to the resource ID (this function unit is the in-charge function unit of the target NE).

Step 2, the access function unit of the MO 10 forwards the management message to the in-charge function unit of the target NE.

Step 3, the in-charge function unit of the target NE receives the management message and obtains the ID of the access function unit of the target NE according to the ID information of the target NE.

Specifically, the in-charge function unit of the target NE can obtain the ID of the access function unit of the target NE according to a corresponding relationship stored in the P2P NE between the target NE and the access function unit of the target NE.

Wherein, the corresponding relationship between the target NE and the access function unit of the target NE is established when the target NE registers to the P2P network. Specifically, the target NE can select one function unit in the P2P network as the access function unit thereof according to a predetermined policy (for example, by region, by load, or the like). After the target NE establishes a connection with the function unit, the target Ne sends a request for storing the access corresponding relationship to the function unit, with the request carrying the ID information of the target NE, the ID of the function unit, or other information. After receiving the request, the function unit obtains the in-charge function unit of the target NE according to the ID information of the target NE, and then forwards the request to the in-charge function unit by means of the P2P algorithm. The in-charge function unit stores the corresponding relationship between the ID information of the target NE and the ID of the access function unit of the target NE.

To be convenient for subsequent query, the in-charge function unit of the target NE can store the management task carried in the management message after receiving the management message.

Step 4, the in-charge function unit of the target NE sends the management message to the access function unit of the target NE by means of P2P algorithm.

Step 5, the access function unit of the target NE sends the management task to the target NE.

In the above steps, if the in-charge function unit of the target NE does not store the management task, after receiving the management message, the MO 10 can obtain the access function unit of the target NE according to the corresponding relationship between the target NE and the access function unit of the target NE stored in the P2P network, and then directly forward the management message to the access function unit of the target NE, and the access function unit sends the management task to the target NE.

Through the above steps, the management task can be sent to the target NE via the P2P network.

After receiving the management task, the target NE executes the management task. The target NE reports corresponding management data to the function units 20 in the P2P network when trigger conditions set for the management task are triggered, and the function units 20 in the P2P network receive and store the management data. Furthermore, further, the function units 20 in the P2P network also can forward the management data to the MO 10. During the specific implementation, the management data can reach the MO 10 from the following paths: access function unit of the target NE—in-charge function unit of the target NE—access function unit of the MO 10—MO10. Or, the management data also may not get around the in-charge function unit of the target NE. Therefore, the report of the management data is implemented.

Furthermore, to be convenient for subsequent query, the function units 20 in the P2P network can store the management data after receiving the management data reported by the target NE. Preferably, the management data can be saved on the in-charge function unit of the target NE.

In the case that the in-charge function unit of the target NE in the P2P network stores the management data reported by the target NE, the method can further include the following steps. The MO 10 sends a query request to the P2P network to query management data reported by a certain target NE, wherein the query request carrying corresponding query conditions; after receiving the query request, the access function unit of the MO 10 in the P2P network forwards the query request to an in-charge function unit of the target NE according to the ID information of the target NE, and the in-charge function unit obtains the management data meeting the conditions according to the saved management data and returns the management data to the MO 10 via the access function unit of the MO 10. It should be noted that, although an example in which the management data is stored in the in-charge function unit of the target NE is given for description in embodiments of the present invention, it is not limited thereto, in practical application, the management data also can be stored in other function units in the P2P network, by means of P2P algorithm, each function unit in the P2P network can query the stored management data.

During the specific implementation, in order to ensure the security of network, before sending the management message to one or more function units 20, the MO 10 also can authenticate the logged-in management role. Specifically, the MO 10 can send a query message to the P2P network to query the permission information of the management role. After receiving the query message, the function units 20 in the P2P network return the permission information of the management role to the MO 10 (please refer to Embodiment 4 below for specific flows) according to the ID information of the management role. The MO 10 can judge whether the management role has a permission for setting the management task according to the returned permission information of the management rote, if so, it sends the management message to one or more function units 20.

The operation way of the NMS provided in embodiments of the present invention will be described below by specific embodiments with reference to FIG. 4.

Figure 4:
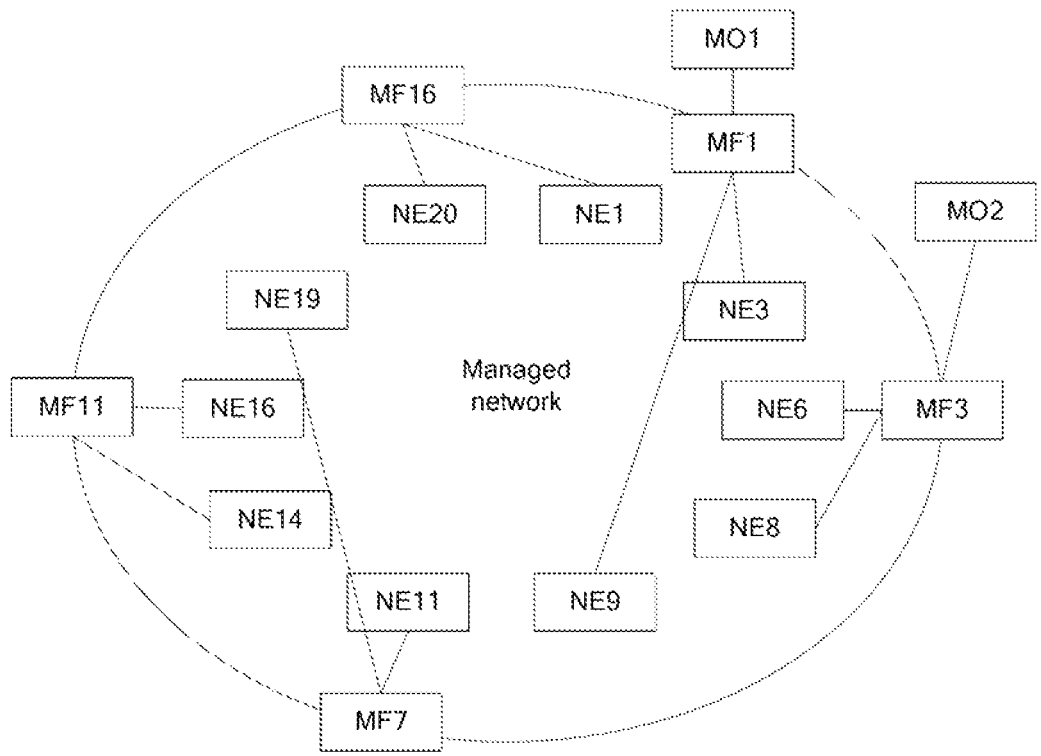
FIG. 4 is an architecture schematic diagram of a NMS according to an embodiment of the present invention.

FIG. 4 is a schematic diagram of a NMS according to an embodiment of the present invention, in FIG. 4, the P2P network consists of function units of MF1, MF3, MF7, MF11 and MF16 etc., and MO1 and MO2 respectively access the P2P network via MF1 and MF3. The managed network consists of many NEs of NE1, NE3, NE6, NE8, NE9, . . . , NE20 etc., and selects a proper function unit (MF) according to a certain policy to access the P2P network.

Embodiment 1

The embodiment will describe the flow of setting management permission in embodiments of the present invention below.

Figure 5:
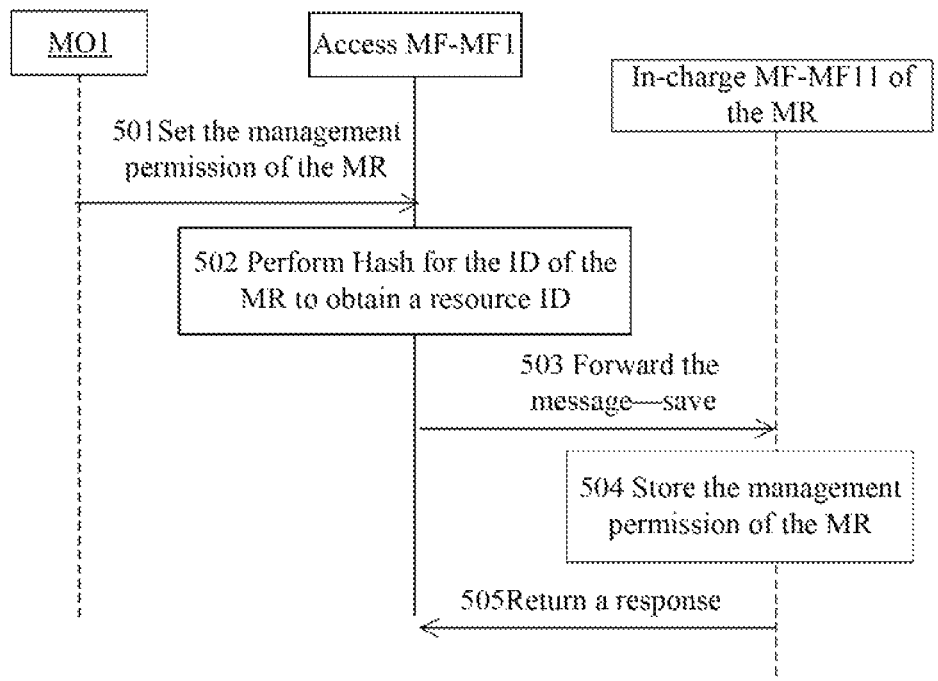
FIG. 5 is a flow chart according to Embodiment 1 of the present invention.

The NMS may create many management roles, different management roles have different permissions, particularly, a super manager role MR all is set in the embodiment, the role has the highest permission, and the role can authorize other management roles after logging in the MO. Besides, an MR with permission of authorization can assign permission to other MR within its permission. By taking logging in MO1 by MR all and authorizing the MR1 as example, the flow is as shown in FIG. 5.

Step 501, the MO1 sends a request for setting permission of the MR1 to the access MF1 of the MO1 according to an instruction of the MR all, wherein, the request includes ID of the MR1, ID of the target NE, ID of the MF and the set permission.

Step 502, after receiving the request, the MF1 performs Hash for the ID of the MR1 to obtain a resource ID.

Step 503, the MF1 forwards the request to the in-charge MF11 of the MR1 via the P2P network according to the P2P algorithm employed by the P2P management network.

Step 504, after receiving the request, the MF11 stores the set permission information, specifically stores it in file, physical database, memory bank and other forms.

Step 505, the MF11 returns a storage result response to the MF1 via the P2P network.

Embodiment 2

The embodiment will describe the registration flow of the MO in embodiments of the present invention below.

Figure 6:
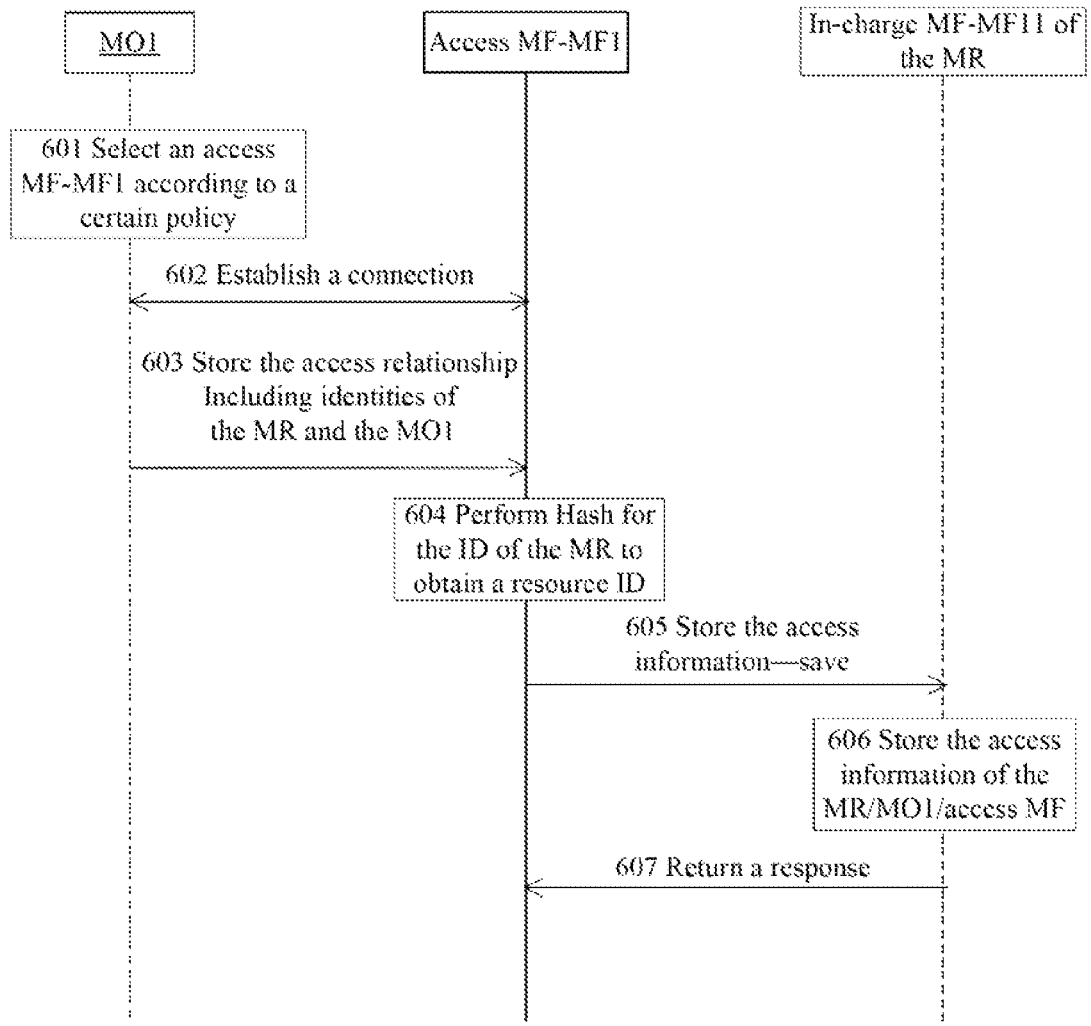
FIG. 6 is a flow chart according to Embodiment 2 of the present invention.

The MR needs to log in the MO to implement management. Therefore the MO is required to access the P2P network via access function unit MF, and access corresponding relationship between the MO and the MR needs to be stored. By taking registration of the MO1 into the P2P network when the MR1 logs in the MO1 as example. As shown in FIG. 6, the registration flow of the MO(1) mainly includes the following steps.

Step 601, when manager logs in the MO1, the MO1 selects an access function unit according to a certain policy. In the embodiment, the access function unit selected by the MO1 is MF1.

Step 602, the MO1 establishes a connection with the MF1.

Step 603, the MO1 sends a storage request for storing the access relationship to the MF1, wherein, the storage request including identities of the MR1 and the MO1, ID of the MF1, and other access information.

Step 604, after receiving the storage request, the MF1 performs Hash (also called Hash algorithm) for the ID of the MR1 to obtain a resource ID.

Step 605, according to the P2P algorithm, via the P2P network, the MF1 forwards the request message for storing the MO access information to the in-charge MF with the resource ID, the in-charge MF is MF11 in the embodiment.

Step 606, after receiving the storage request, the MF11 stores the access relationship, wherein, the stored access relationship includes corresponding relationship of access information such as ID of the MR1, ID of the MO1 and ID of the MF1.

Step 607, the MF11 returns a response to the MF1 via the P2P network, wherein the response carries the storage result.

It should be noted that, the MO also may access the P2P network consisting of MFs via the in-charge MF, and the access information is saved in the in-charge MF. Correspondingly, various subsequent message interactions between the MO and the P2P management network are also performed directly via the in-charge MF.

Embodiment 3

The embodiment will describe registration flow of a managed NE below.

Figure 7:
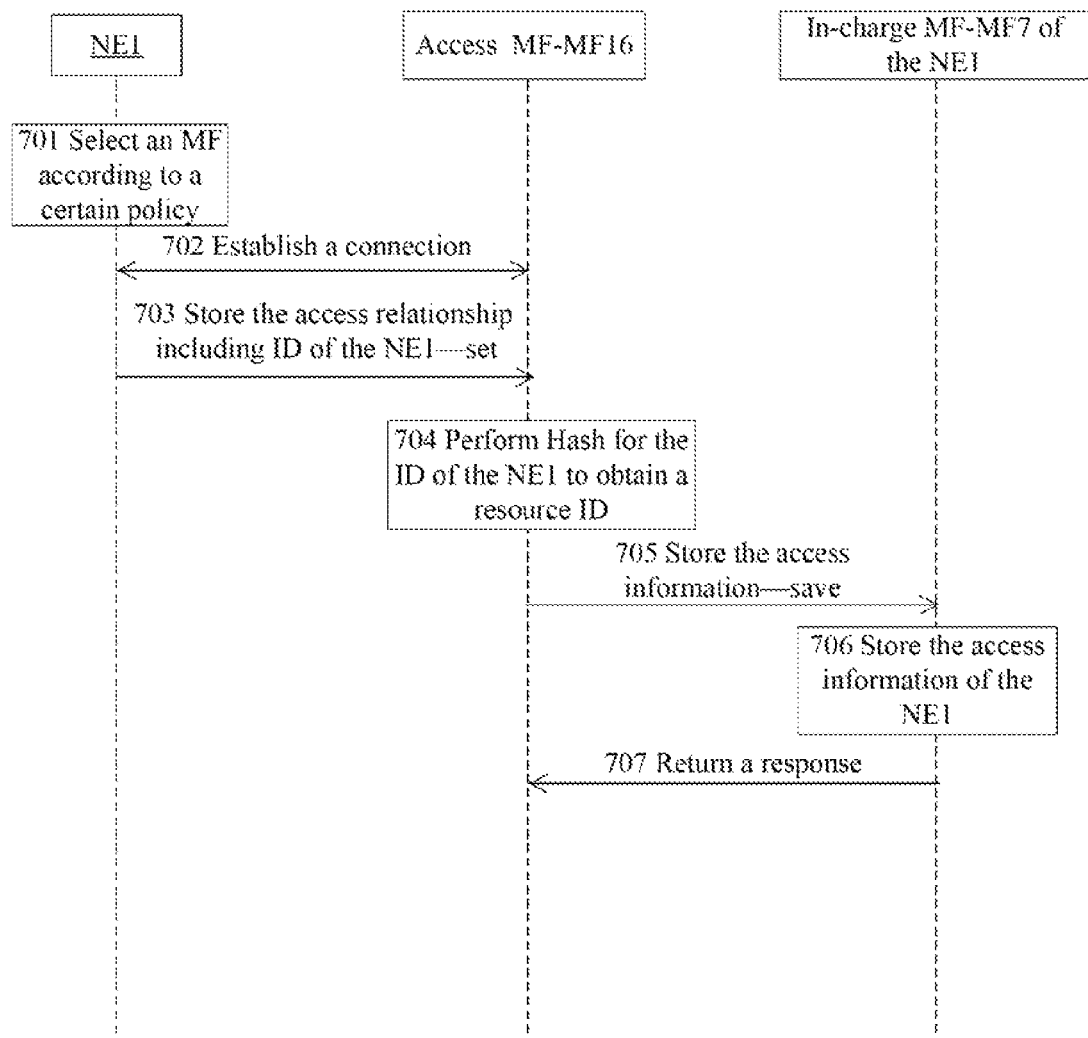
FIG. 7 is a flow chart according to Embodiment 3 of the present invention.

The managed NE needs to initiate registration to the P2P management network when joining in managed network, so as to access management network to accept its management. By taking the access of the NE1 to the P2P management network via the MF16 as example, the specific flow is as shown in FIG. 7.

Step 701, the NE1 selects one MF according to a certain policy as an access MF, in the embodiment, the selected MF is MF16.

Step 702, the NE1 establishes a connection with the MF16.

Step 703, the NE1 sends a storage request for storing access relationship to the MF16, wherein, the request includes the identities of the NE1 and the MF16 and other access information.

Step 704, after receiving the storage request, the MF16 performs Hash for the ID of the NE1 to obtain a resource ID.

Step 705, according to the P2P algorithm, via the P2P network, the MF16 forwards the storage request for storing the NE access information to the in-charge MF with the resource ID. The in-charge MF is MF7 in the embodiment.

Step 706, after receiving the storage request, the MF7 stores the access information as access relationship, wherein the access information may include the ID of the NE1, and the ID of the MF16 etc.

Step 707, the MF7 returns a response to the MF16 via the P2P network, wherein the response carries the storage result.

It should be noted that, the NE also may access the P2P network consisting of MFs via the in-charge MF, and the access information is saved in the in-charge MF. Correspondingly, various subsequent message interactions between the NE and the P2P management network are also performed directly via the in-charge MF.

Embodiment 4

The embodiment will describe the flow that a MO obtains permission of the current manager (i.e., management role) below.

Figure 8:
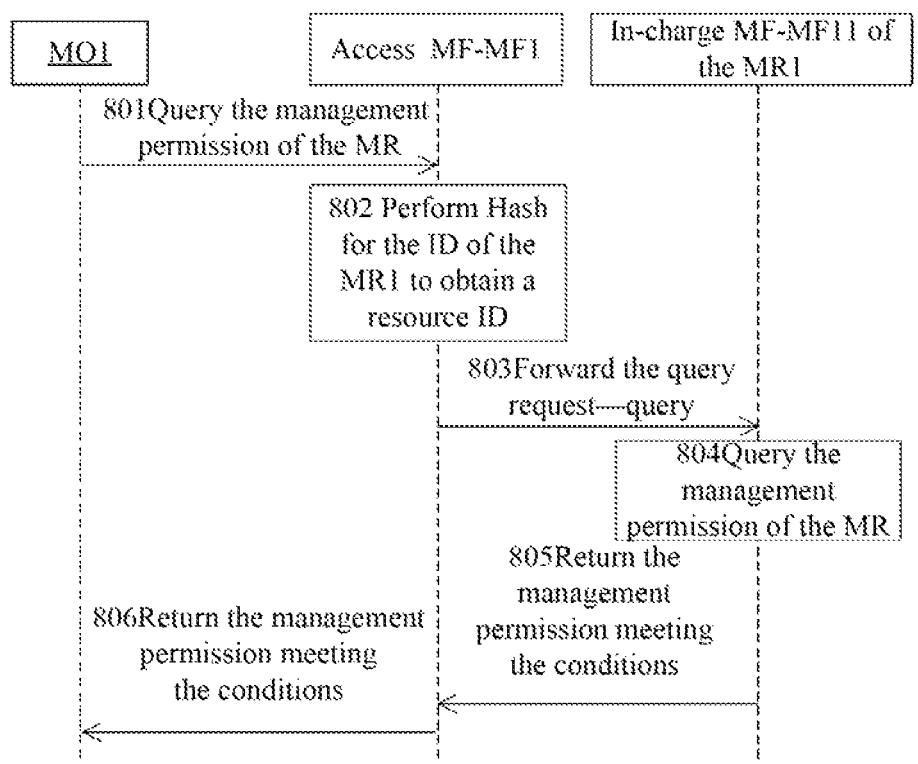
FIG. 8 is a flow chart according to Embodiment 4 of the present invention.

When submitting a management task to the P2P network via the MO, a management role first needs to obtain its permission. By taking the obtaining of permission after the MR1 logs in the MO1 as example, the specific flow is as shown in FIG. 8.

Step 801, the MO1 accesses the MF1 and sends a request for querying permission of the MR1, with the request including the ID of the MR1 and other query conditions.

Step 802, after receiving the request, the MF1 performs Hash for the ID of the MR1 to obtain a resource ID.

Step 803, according to the P2P algorithm employed by the P2P management network, via the P2P network, the MF1 forwards the request message to the in-charge MF11 of the MR1.

Step 804, after receiving the request, according to conditions, the MF11 obtains the permission setup information owned by the role.

Step 805, the MF11 returns the permission setup information meeting the conditions to the MF1 via the P2P network.

Step 806, the MF1 returns the permission setup information meeting the conditions to the MO1.

It should be noted that, in the embodiment, an example in which the P2P network determines the in-charge function unit of the MR from the ID of the MR is given for description, but it is not limited thereto. In practical application, the in-charge function unit of the MR also may be determined from the ID of the MO in which the MR logs, in this case, in Step 802, the MF1 performs Hash for the ID of the MO1 to obtain a resource ID and then obtains the corresponding in-charge function unit according to the resource ID.

Embodiment 5

The embodiment will describe the management task set for a target NE by the MO below.

Figure 9:
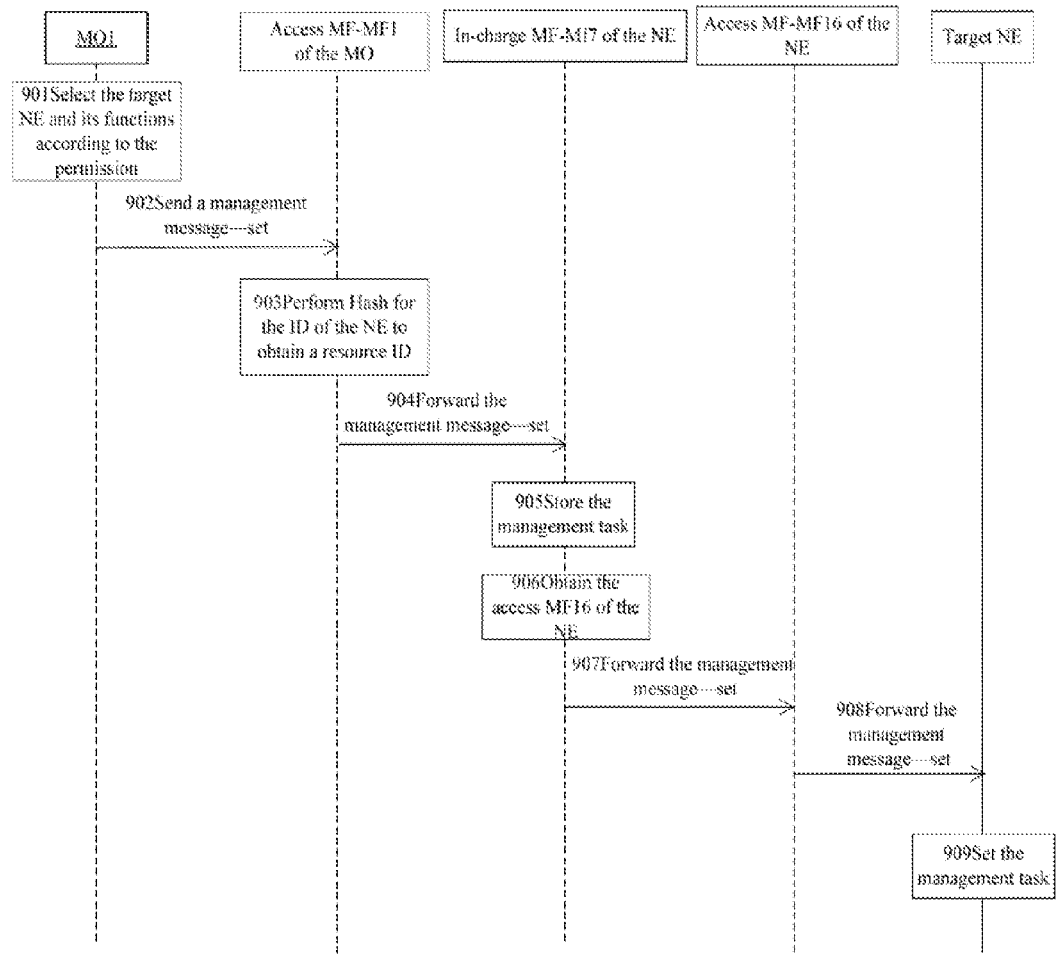
FIG. 9 is a flow chart according to Embodiment 5 of the present invention.

After logging in the MO, the manager can set management tasks for NEs within its permission. By taking a case in which the MR1 logs in the MO1 and sets a management task for the NE1 as example, the specific flow is shown in FIG. 9.

Step 901, the MR1 selects NE1 on the MO1 to set a management task for the NE1 within its permission.

Step 902, the MO1 sends a management task setup request to the MF1, with the request including the ID of the NE1 and the management task information of the NE1.

Step 903, after receiving the request, the MF1 performs Hash for the ID of the NE1 to obtain a resource ID.

Step 904, according to the P2P algorithm employed by the P2P network, via the P2P network, the MF1 forwards the request to the in-charge MF7 of the NE1.

Step 905, after receiving the request, the MF7 stores the management task.

Step 906, the MF7 obtains the access MF of the NE1. The access MF is MF16 in the embodiment.

Step 907, according to the P2P algorithm, via the P2P network, the MF7 forwards the management task setup request to the MF16.

Step 908, the MF16 forwards the management task setup request to the NE1.

Step 909, the NE1 sets the management task according to the received request.

Embodiment 6

The embodiment will describe management data reported by a managed NE below.

Figure 10:
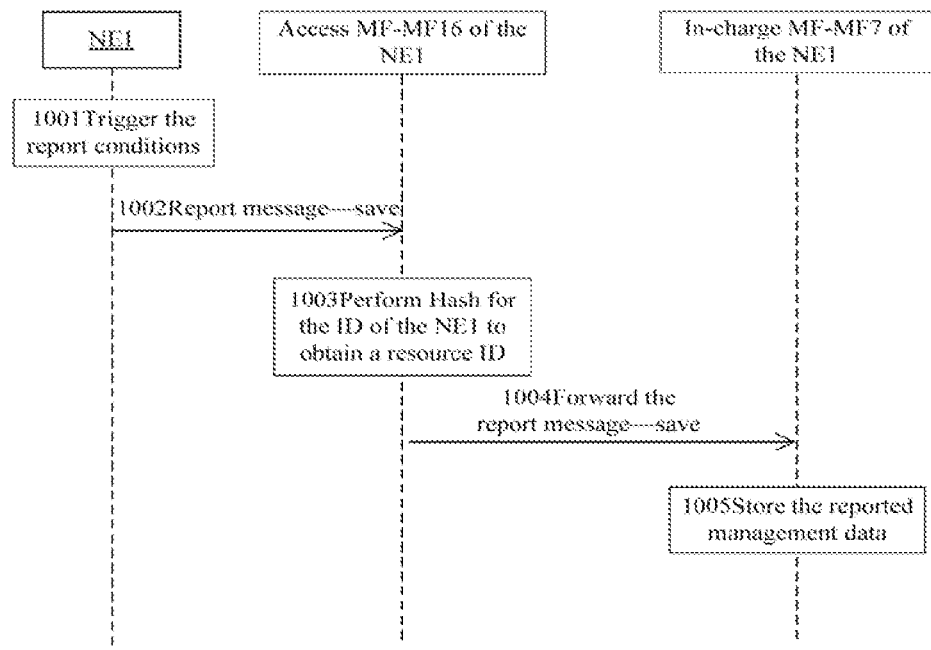
FIG. 10 is a flow chart according to Embodiment 6 of the present invention.

A managed NE needs to report collected management data such as performance data or alarm data to the P2P network. By taking the report of the management data by the NE1 as example, the specific flow is shown in FIG. 10.

Step 1001 conditions for reporting management data in the NE1 are triggered, for example, the set management task conditions or alarm conditions or the like.

Step 1002, the NE1 sends report message for report management data to the access MF16.

Step 1003, after receiving the report message, the MF16 performs Hash for the ID of the NE1 to obtain a resource ID.

Step 1004, according to the P2P algorithm, via the P2P network, the MF16 forwards management data report message to the in-charge MF7 of the NE1.

Step 1005, after receiving the reported management data, the MF7 stores the management data. Specifically, the management data may be stored in file, physical database, memory bank and other modes, and when stored, the management data may be sorted into categories (for example, performance data, alarm data or the like), and then sorted into subcategories (for example, call processing performance data, call failure alarm data or the like).

After receiving the management data, the MF7 may send the management data to the access MF of the MO that sets the corresponding management task via the P2P network, and then the MF forwards the management data to the MO.

Embodiment 7

The embodiment will describe a query of management data by the MO below.

Figure 11:
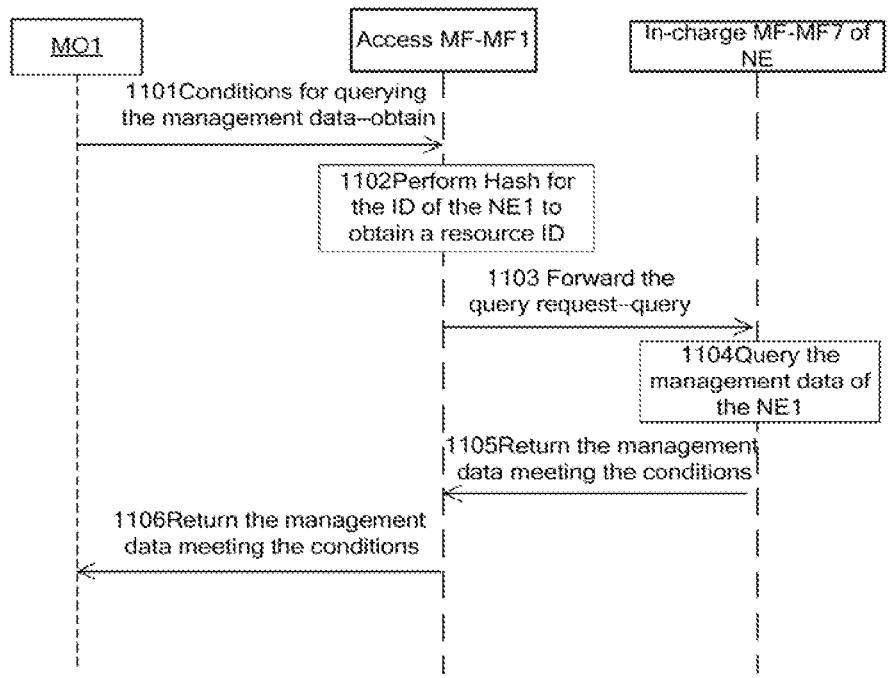
FIG. 11 is a flow chart according to Embodiment 7 of the present invention.

After logging in the MO, the manager can query management data of NEs within its permission. By taking a case in which the MR1 queries the management data reported by the NE1 or the management data generated according to reported data within its permission after logging in the MO1 as example, the specific flow is shown in FIG. 11.

Step 1101, the MO1 sends a management data query request to the MF1 of the MO, with the request including the ID of the NE1 and query conditions.

Step 102, after receiving the request, the MF1 performs Hash for the ID of the NE1 to obtain a resource ID.

Step 1103, according to the P2P algorithm employed by the P2P management network, via the P2P network, the MF1 forwards the request message to the in-charge MF7 of the NE1.

Step 1104, after receiving the request, the MF7 obtains the management data meeting the conditions.

Step 1105, the MF7 returns the management data meeting the conditions to the MF1.

Step 1106, the MF1 forwards the management data to the MO1.

Through the embodiment, the manager can query the management data reported by the managed NE.

From the above description, it can be seen that, in embodiments of the present invention, function units form a P2P network by means of P2P protocol and the function units interact messages by means of P2P protocol, the MO accesses the P2P network via the function units, NEs of a managed network also access the P2P network via the function units, and the MO manages the managed network by the P2P management network. So that, a NMS with high stability, high expansibility and flexible management permission setup can be established and operated with relatively low costs via inexpensive equipment such as a common PC, and various networks can be managed effectively. Furthermore, as function units of the NMS have no strict division in terms of geographic or administrative region or role, the managed NEs can select access function units freely and the in-charge function units also can be adjusted automatically according to the P2P algorithm. Therefore, when parts of function units break down or operate unstably, the managed NEs can access the P2P network and perform relevant processing via other available function NEs, so that the normal running of network management is guaranteed.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of the claims of the present invention.

The invention claimed is:

1. A network management system, comprises a manipulating organ computer and a peer-to-peer network, with the peer-to-peer network consisting of a plurality of function unit computers, wherein, the manipulating organ computer is configured to generate a management task according to an operation of a management role and to send the management task to the peer-to-peer network; and the function unit computers in the peer-to-peer network are configured to perform the management task for a managed network or store relevant data, and the manipulating organ computer accesses the peer-to-peer network via one or more function unit computers;

wherein, a first function unit computer in the peer-to-peer network is configured to receive the management task sent by the manipulating organ computer and forward the management task to a second function unit computer in the peer-to-peer network, wherein an ID of the second function unit computer and an ID of a target net element in the managed network managed by the management task meet a preset matching relationship;

the second function unit computer is configured to store the management task and forward the management task to a third function unit computer in the peer-to-peer network, wherein the third function unit computer is a function unit computer connected with the target net element; and the third function unit computer is configured to forward the management task to the target net element.

2. The network management system according to claim 1, wherein, the third function unit computer is further configured to receive management data returned by the target net element in response to the management task, and to send the management data to the second function unit computer; and the second function unit computer is further configured to receive and to save the management data.

3. The network management system according to claim 2, wherein, the second function unit computer is further configured to forward the management data to the first function unit computer; and the first function unit computer is further configured to forward the management data to the manipulating organ computer.

4. The network management system according to claim 3, wherein the function unit computers in the peer-to-peer network are further configured to store corresponding relationships between the ID of a function unit computer to which each net element of the managed network is connected and the ID of this net element.

5. The network management system according to claim 3, wherein the function unit computers in the peer-to-peer network are further configured to store corresponding relationships between the ID of a function unit computer to which the manipulating organ computer is connected and the ID of the manipulating organ computer.

6. The network management system according to claim 2, wherein, the manipulating organ computer is further configured to send a query request to the first function unit computer, to request a query of management data reported by the target net element;

the first function unit computer is further configured to forward the query request to the second function unit computer; and the second function unit computer is further configured to query the saved management data according to the query request, and to return query results to the manipulating organ computer via the second function unit computer and the first function unit computer.

7. The network management system according to claim 6, wherein the function unit computers in the peer-to-peer network are further configured to store corresponding relationships between the ID of a function unit computer to which each net element of the managed network is connected and the ID of this net element.

8. The network management system according to claim 6, wherein the function unit computers in the peer-to-peer network are further configured to store corresponding relationships between the ID of a function unit computer to which the manipulating organ computer is connected and the ID of the manipulating organ computer.

9. The network management system according to claim 2, wherein the function unit computers in the peer-to-peer network are further configured to store corresponding relationships between the ID of a function unit computer to which each net element of the managed network is connected and the ID of this net element.

10. The network management system according to claim 2, wherein the function unit computers in the peer-to-peer network are further configured to store corresponding relationships between the ID of a function unit computer to which the manipulating organ computer is connected and the ID of the manipulating organ computer.

11. The network management system according to claim 1, wherein, the manipulating organ computer is further configured to receive permission information set for a management role, and to send the permission information to the peer-to-peer network; and the function unit computers in the peer-to-peer network are further configured to store permission information of the management role.

12. The network management system according to claim 11, wherein the function unit computers in the peer-to-peer network are further configured to store corresponding relationships between the ID of a function unit computer to which each net element of the managed network is connected and the ID of this net element.

13. The network management system according to claim 11, wherein the function unit computers in the peer-to-peer network are further configured to store corresponding relationships between the ID of a function unit computer to which the manipulating organ computer is connected and the ID of the manipulating organ computer.

14. The network management system according to claim 1, wherein the function unit computers in the peer-to-peer network are further configured to store corresponding relationships between the ID of a function unit computer to which each net element of the managed network is connected and the ID of this net element.

15. The network management system according to claim 1, wherein the function unit computers in the peer-to-peer network are further configured to store corresponding relationships between the ID of a function unit computer to which the manipulating organ computer is connected and the ID of the manipulating organ computer.

16. A network management method, used in a network management system comprising a manipulating organ computer and a peer-to-peer network, wherein the peer-to-peer network consists of function unit computers, and the manipulating organ computer accesses the peer-to-peer network via one or more function unit computers, the method comprises:

generating or setting, by the manipulating organ computer, a management task according to an operation of a management role and sending the management task to the peer-to-peer network; and receiving, by the function unit computers in the peer-to-peer network, the management task, and sending the management task to a target net element in a managed network corresponding to the management task;

wherein the step that the function unit computers in the peer-to-peer network receiving the management task and sending the management task to the target net element comprises:

receiving, by a first function unit computer in the peer-to-peer network, the management task, and obtaining a second function unit computer in the peer-to-peer network, wherein an ID of the second function and the ID information meet a preset matching relationship;

forwarding, by the first function unit computer, the management task to the second function unit computer;

receiving, by the second function unit computer, the management task and obtaining an ID of a third function unit computer in the peer-to-peer network, wherein the third function unit computer is a function unit computer connected with the target net element;

forwarding, by the second function unit computer, the management task to the third function unit computer; and receiving, by the third function unit computer, the management task and sending the management task to the target net element.

17. The method according to claim 16, wherein, after the second function unit computer receiving the management task, the method further comprises: storing, by the second function unit computer, the management task.

18. The method according to claim 16, wherein, after sending the management task to the target net element, the method further comprises:

reporting, by the target net element, management data corresponding to the management task to the third function unit computer;

forwarding, by the third function unit computer, the management data to the second function unit computer; and receiving and storing, by the second function unit computer, the management data.

19. The method according to claim 18, wherein, after the second function unit computer receiving the management data, the method further comprises:

sending, by the second function unit computer, the management data to the first function unit computer; and forwarding, by the first function unit computer, the management data to the manipulating organ computer.

20. The method according to claim 18, wherein, after the second function unit computers store the management data, the method further comprises:

sending, by the manipulating organ computer, a query request to the first function unit computer, to query the management data reported by the target net element;

forwarding, by the first function unit computer, the query request to the second function unit computer; and querying, by the second function unit computer, the saved management data according to the query request, and forwarding the obtained management data to the manipulating organ computer via the first function unit computer.

* * * * *